United States Patent
Jones

(10) Patent No.: US 10,313,285 B1
(45) Date of Patent: *Jun. 4, 2019

(54) SYSTEM AND METHOD FOR ANALYZING AND FILTERING JOURNALED ELECTRONIC MAIL

(71) Applicant: OPEN INVENTION NETWORK LLC, Durham, NC (US)

(72) Inventor: Nathan Robert Jones, Avondale Estates, GA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,791

(22) Filed: Nov. 22, 2016

Related U.S. Application Data

(63) Continuation of application No. 14/072,242, filed on Nov. 5, 2013, now Pat. No. 9,515,973, which is a continuation of application No. 11/561,051, filed on Nov. 17, 2006, now Pat. No. 8,583,731.

(51) Int. Cl.
*G06F 15/16* (2006.01)
*H04L 12/58* (2006.01)

(52) U.S. Cl.
CPC ............. *H04L 51/12* (2013.01); *H04L 51/22* (2013.01)

(58) Field of Classification Search
CPC ................................ H04L 51/12; H04L 51/22
USPC .......................................................... 709/207
See application file for complete search history.

(56) References Cited

U.S. PATENT DOCUMENTS

| | | | |
|---|---|---|---|
| 6,721,713 B1* | 4/2004 | Guheen | G06Q 50/01 705/1.1 |
| 2005/0102381 A1* | 5/2005 | Jiang | H04L 63/101 709/220 |
| 2006/0053279 A1* | 3/2006 | Coueignoux | H04L 51/12 713/154 |
| 2007/0113035 A1* | 5/2007 | DeVos | G06F 11/1451 711/162 |
| 2007/0179945 A1* | 8/2007 | Marston | G06Q 10/107 |

* cited by examiner

*Primary Examiner* — Karen C Tang

(57) ABSTRACT

A system, method, and program for the processing of large amounts of email based on user-configurable criteria in close to real-time. The invention enables filtering of all journaled emails in an organization for the duration of a regulatory proceeding, or for audit purposes, thus greatly reducing the manual effort required to produce a targeted set of emails. The journaling feature copies all unique emails coming through the distributed email server farm to a smaller set of email mailboxes. The filtering application could run as a batch operation on each of those "journaling" mailboxes at periodic intervals or could run interactively. The user-defined filter criteria are applied to the emails filling up the "journaling" mailboxes, and matches are separated from the non-matches for analysis. The invention can be executed on offline data, such as personal message stores or individual compound message files.

38 Claims, 13 Drawing Sheets

| MAIL ANALYZER | | |
|---|---|---|
| FILE TOOLS HELP | | |
| Job Settings | Job Progress | |
| Name | Demo Job | |
| Inputs | Job Inputs (1) | |
|   Demo Input Source | Type: PST, Location: C:\Stuff\MailAnalyzer\SCSFERC.pst | |
| Outputs | Job Outputs (1) | |
|   Demo Output | Type: PST, Location: C:\Stuff\MailAnalyzer\DemoOutput.pst | |
| Rules | Job Rules (4) | |
|   Attorney | Name: Attorney | |
|   Transmission to Generation | Name: Transmission to Generation | |
|   Generation to Transmission | Name: Generation to Transmission | |
|   Keyword | Name: Keyword | |
| Status | E:\Southern\Apps\MailAnalyzer\MailAnalyzer\bin\Debug\St | |
|   FileName | E:\Southern\Apps\MailAnalyzer\MailAnalyzer\bin\Debug\St | |
|   Resume | False | |
| Reports | Job Reports (2) | |
|   Email Report | Type: Email, Target: natjones@southernco.com | |
|   File Report | Type: File, Target: E:\Southern\Apps\MailAnalyzer\MailAna | |
| Name | | |
| The name of the job. | | |

[ Refresh Job Settings ] [ Validate Settings ]     [ Cancel ] [ Run ]
0%     00:00:00

500 — MAIL ANALYZER
510 — Job Settings
520 — Name
530 — Demo Input Source
540 — Demo Output
550 — Keyword
560 — Resume
570 — File Report
580 — The name of the job
590 — Validate Settings

FIG. 5

| Inputs | Job Inputs (1) |
|---|---|
| G2JOURNALINGGPC | Type: Mailbox, Location: GAXGPEX15:G2JOURNALINGGPC |
| Name | G2JOURNALINGGPC |
| Type | Mailbox |
| Location | GAXGPEX15:G2JOURNALINGGPC |
| Recurse | False |
| AccessMode | MoveLocal |
| MaxResults | 5000 |
| UseCache | False |
| Retain | False |
| MaxBytes | 0 |

FIG. 10

| Outputs | Job Outputs (1) |
|---|---|
| output | Type: Mailbox, Location: ALXAPEX25:G2SCSFD |
| Name | output |
| Type | Mailbox |
| Location | ALXAPEX25:G2SCSFD |
| AllowDuplicates | False |

FIG. 11

| Rules | Job Rules (4) |
|---|---|
| ⊟ Attorney | Name: Attorney |
| ⊟ Filter | Filter Type: Collection |
| ⊞ Filters | Rule Filters (2) |
| Values | Filter Values (0) |
| Type | Collection |
| Target | Subject |
| Comparison | Equal |
| FileName | |
| Match | All |
| ⊟ Action | Type: Copy |
| Type | Copy |
| Output | output |
| Folder | $(RuleName) Matches |
| Name | Attorney |
| Input | * |
| InputFolder | * |
| DependsOn | |
| ⊞ Transmission To Genera | Name: Transmission To Generation |
| ⊞ Generation To Transmiss | Name: Generation To Transmission |
| ⊞ Keyword | Name: Keyword |

FIG. 12

Status:
```xml
<Status filename="Status\$(JobName)_$(Timestamp).status" resume="true" />
```

Reports:
```xml
<Reports>
    <Report type="Email" target="mamalerts@southernco.com"
        condition="All" />
    <Report type="File" target="Reports\$(JobName)_$(Timestamp).log"
        writemode="Append" />
</Reports>
```

Inputs:
```xml
<Inputs>
    <Input name="G2JOURNALINGGPC" type="Mailbox"
        location="GAXGPEX15:G2JOURNALINGGPC" accessmode="MoveLocal"
        maxresults="5000" retain="false" />
</Inputs>
```

Outputs:
```xml
<Outputs>
    <Output name="output" type="Mailbox" location="ALXAPEX25:G2SCSFD"
        allowduplicates="false" />
</Outputs>
```

FIG. 16

Rules:
```
<Rules>
    <Rule name="Generation To Transmission" input="*" folder="Inbox">
        <Filter type="Collection" match="All">
            <Filter type="Collection" match="Any">
                <Filter type="Compare" target="SenderEmail" comptype="Equal"
                    filename="..." match="Any" />
            </Filter>
            <Filter type="Collection" match="Any">
                <Filter type="Compare" target="RecipientEmail" comptype="Equal"
                    filename="..." match="Any" />
            </Filter>
            <Filter type="Not">
                <Filter type="Collection" match="Any">
                    <Filter type="Compare" target="SenderDisplayName" comptype="Contains"
                        filename="..." match="Any" />
                    <Filter type="Compare" target="RecipientDisplayName" comptype="Contains"
                        filename="..." match="Any" />
                </Filter>
            </Filter>
        </Filter>
        <Action type="Copy" output="output" folder="$(RuleName) Matches" />
    </Rule>
</Rules>
```

FIG. 17

SYSTEM AND METHOD FOR ANALYZING AND FILTERING JOURNALED ELECTRONIC MAIL

CROSS-REFERENCE TO RELATED APPLICATIONS

This application is a continuation of and claims priority from U.S. patent application Ser. No. 14/072,242, filed on Nov. 5, 2013, entitled SYSTEM AND METHOD FOR ANALYZING AND FILTERING JOURNALED ELECTRONIC MAIL, issued as U.S. Pat. No. 9,515,973 on Dec. 6, 2016, which is a continuation of U.S. patent application Ser. No. 11/561,051, filed on Nov. 17, 2006 entitled SYSTEM AND METHOD FOR ANALYZING AND FILTERING JOURNALED ELECTRONIC MAIL, issued as U.S. Pat. No. 8,583,731 on Nov. 12, 2013, which is incorporated by reference herein in their entirety.

BACKGROUND OF THE INVENTION

The present invention relates generally to electronic mail processing for audits and regulatory compliance and, more specifically, to analysis and filtering of electronic mail from various input data sources.

Large corporations having thousands of employees communicate with each other using standard commercial electronic mail software applications such as Microsoft Outlook and IBM Lotus Notes that are processed through Microsoft Exchange or Lotus Domino in a client-server relationship. A large volume of electronic mail messages is sent and received daily using these and other commercial electronic mail (email) applications.

As the growth of electronic mail communications in all types of businesses has increased dramatically over the past decade, so has the need to journal and archive these electronic communications for audits, regulatory compliance and potential legal discovery. Governmental requirements for storing electronic communications has significantly affected operation of messaging systems. Many companies are implementing solutions to archive all sent and received electronic mail for long periods of time.

When a company is under an audit or other regulatory proceeding, it may be required to provide electronic mail communications pertaining to certain criteria. Manually processing archived electronic mail could take several months depending on the scope of the search that is required. A number of vendors provide software and solutions to address the needs of the electronic discovery market, but are generally very expensive and may require that archived data be sent to the vendor's site for processing.

There is a need for a system and method that enable filtering of all electronic mail company-wide for the duration of a regulatory proceeding or for increased responsiveness to audit requests or electronic discovery requests. The present invention is directed to such a filtering solution that works in conjunction with journaling of electronic mail by electronic mail servers.

SUMMARY OF THE INVENTION

The present invention is directed to a method, system and program product for analyzing and filtering large volumes of email based on user-configurable criteria in near real time. The analysis and filtering system is also referred to herein as the mail analyzer system. The present invention provides a system that filters all emails company-wide, thus greatly reducing the manual effort required to produce a targeted set of emails. The invention also significantly increases responsiveness to an audit request.

There are two main components of the mail analyzer solution: a backend journaling feature of electronic mail servers and a filtering application. The filtering application is applied to journaled email. The journaling feature of electronic mail server copies all unique emails coming through the distributed electronic mail server farm to a smaller set of electronic mail server mailboxes. The filtering application can be run as a batch operation on each of the journaling mailboxes at some specific time interval, e.g., every fifteen minutes. User-defined filter criteria are applied to the emails filling up the journaling mailboxes, and matches can be separated from the non-matches for further analysis. Matches are copied to an output mailbox; non-matches are discarded.

The steps involved in the mail analyzer process include: (1) loading a job configuration file and initializing job settings; (2) initializing a personal store (PST) and/or mailbox outputs; (3) analyzing PST and/or mailbox inputs; (4) removing duplicates from the mailbox outputs; and (5) generating reports and writing them to disk or email.

In one aspect of the invention, a method, system and program product are provided for analyzing and filtering a plurality of electronic mail messages. Each electronic mail message from an input source is copied to a journal mailbox. A plurality of electronic mail messages are then moved to a local store for analysis, where a plurality of filter criteria are applied to each electronic mail message in the local store. Each electronic mail message that matches the filter criteria is determined. A corresponding predefined action is applied to each electronic mail message that matches the filter criteria.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 5 illustrates the mail analyzer job settings user interface in an exemplary embodiment.

FIG. 10 illustrates an exemplary expansion of the Inputs property for a job.

FIG. 11 illustrates an exemplary expansion of the Outputs property for a job.

FIG. 12 illustrates an exemplary expansion of the Rules property for an Attorney rule.

FIGS. 16-17 illustrate an exemplary XML representation of the job settings after the values have been read from a file.

DETAILED DESCRIPTION OF THE INVENTION

Figure 1:
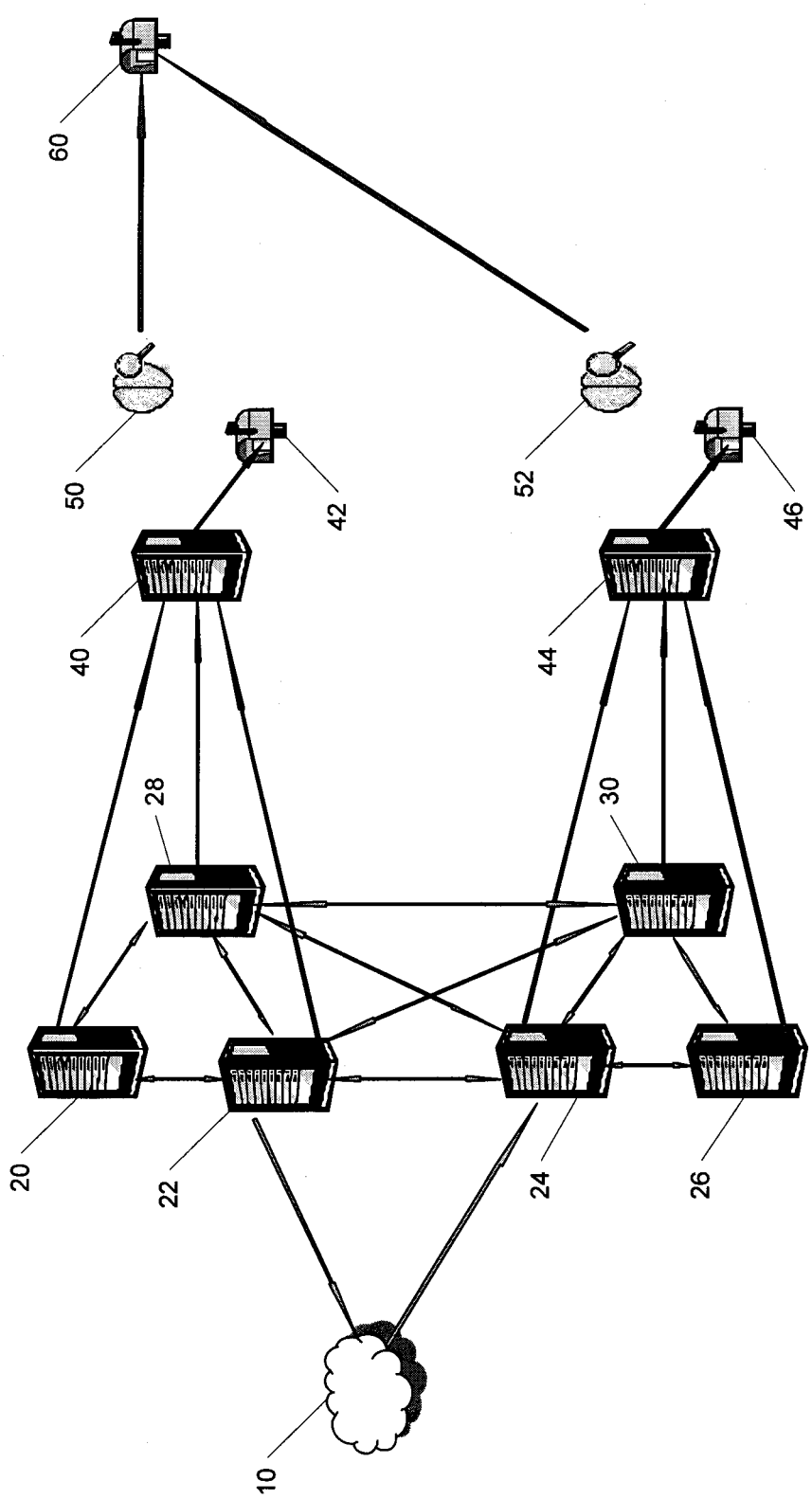
FIG. 1 indicates an infrastructure design for implementation of an exemplary embodiment in a networked electronic mail server environment.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

An exemplary embodiment of the present invention will be described in the context of an electronic mail server environment. The concepts are applicable to electronic mail servers such as Microsoft Exchange or Lotus Domino. The Mail Analyzer system performs searches on email sources and performs a set of actions on the search results. The email sources can include email server mailboxes, personal store (PST) files and compound message (MSG) files. Messages stored in PST files are easily overlooked during email backup and retention processes. PST files increase storage and backup overhead and are very difficult to audit.

| Definition of Terms: | |
|---|---|
| job | Compilation of information that defines the search process, including job inputs, job outputs, job rules, and optionally a job status file and job reports. |
| job input | Source from which emails are read. This can be an Email server mailbox, one or more PST files, or one or more MSG files. |
| job output | Source to which emails are written. This can be either an Email server mailbox or a PST file. |
| job rule | Set of search filters and the action to perform on the results. |
| filter | Search criteria to apply to the job input(s). |
| action | Action to perform with the search results, for example, to copy the results to a folder in a job output source. |
| job status file | File that keeps track of job progress, and supports resuming from the last completed operation. |
| job report | Email or text file report written after a job finishes processing, or is cancelled. |
| journaling | Ability to record all communications in an organization. |
| archiving | Refers to backing up data, removing it from its native environment, and storing it elsewhere. |

There are three types of journaling that can be enabled in a Microsoft Exchange Server 2003 environment. Message-only journaling creates a copy of all messages and the corresponding message header data to and from users on a mailbox database and sends the message copy to a specified mailbox. BCC journaling is message-only journaling with the added ability to capture the BCC recipients. Envelope journaling differs from the other two types in that it permits archiving transport envelope information. This includes information about the recipients who actually received the message, including BCC recipients and recipients from distribution groups. Envelope journaling is most commonly used for compliance purposes. Journaling cannot be enabled on public folder stores.

Journaling is enabled at the mailbox storage level by the administrator entering a mailbox where the journalized messages are sent. The message is delivered to the journal recipient mailbox and journalized using MAPI message format. Journalized messages can be retrieved from the journal recipient mailbox by using Post Office Protocol version 3 (POP3) or Internet Message Access Protocol version 4.1 (IMAP4). This also provides a Multipurpose Internet Mail Extensions (MIME) format for the message.

FIG. 1 indicates an infrastructure design for implementation of an exemplary embodiment in a networked electronic mail server environment. An electronic mail server farm includes email servers 20, 22, 24, 26, 28 and 30 which can send and receive electronic mail over the Internet 10 or an intranet or extranet. Electronic mail that is sent or received can be transmitted from one email server to another. Electronic mail is copied to journaling servers 40, 44 and stored in information (i.e., mailbox) stores 42, 46, respectively. As emails begin filling the journaling mailboxes 42, 46, the mail analyzer applications 50, 52 can be scheduled to run periodically (e.g., every 15 minutes) or can be run interactively. The mail analyzer application can be run in either an interactive mode or as a background task. The mode it runs in is determined by a command line parameter.

Figure 2:
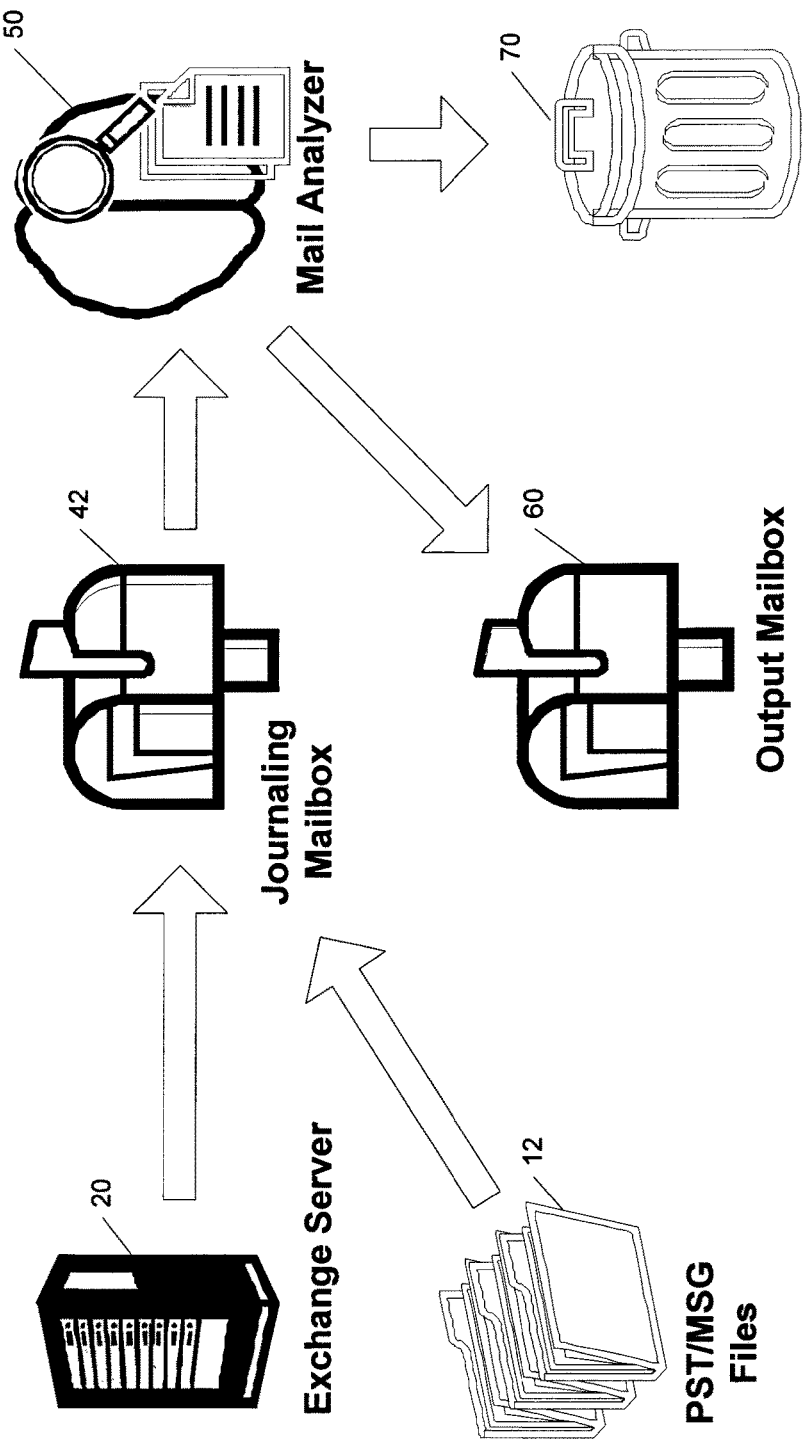
FIG. 2 illustrates a simplified view of the operation the mail analyzer application.

FIG. 2 illustrates a simplified view of the mail analyzer application's operation. As emails arrive at the email server 20, they are copied to a designated "journaling" mailbox 42. Additionally, the mail analyzer application can consume emails from PST or MSG files 12. Each time it runs, the mail analyzer application 50 moves several thousand emails from the journaling mailbox 42 to a local PST file and then runs the filter criteria as defined in a job configuration file against it. The mail analyzer application 50 examines every email in the local PST file. Emails that match the criteria are sent to the output mailbox 60; the non-matches are discarded into delete file 70.

Figure 3:
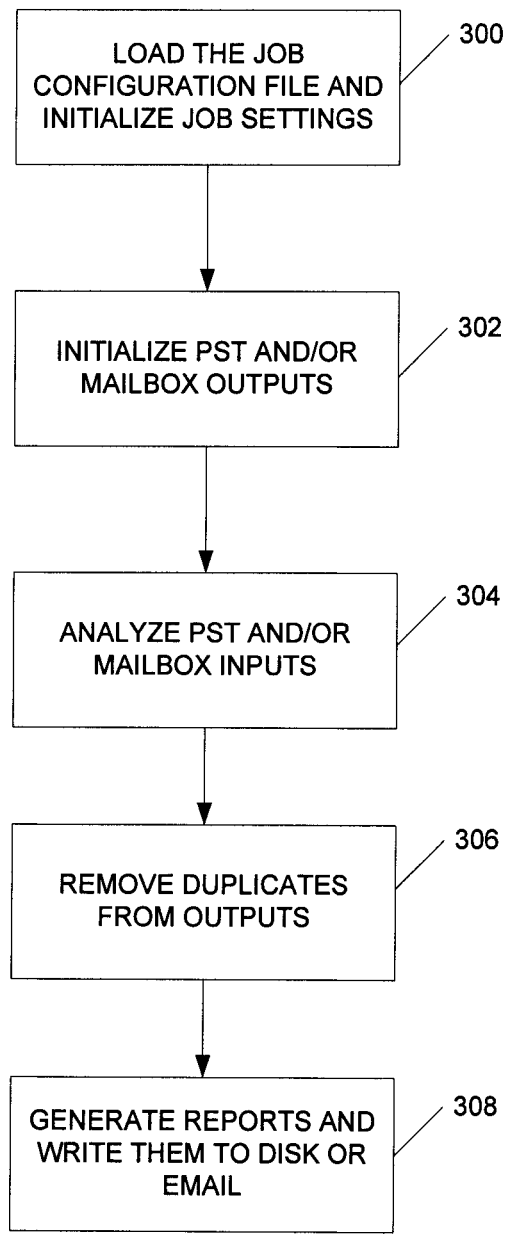
FIG. 3 illustrates an overview of the processing steps for the mail analyzer application.

FIG. 3 illustrates an overview of the processing steps for the mail analyzer application. The mail analyzer application loads the job configuration file and initializes job settings in step 300. The PST and/or mailbox outputs are initialized in step 302. The PST and/or mailbox inputs are analyzed in step 304. Duplicate emails are removed from the outputs in step 306. Reports are generated and written to disk or emails in step 308.

Figure 4:
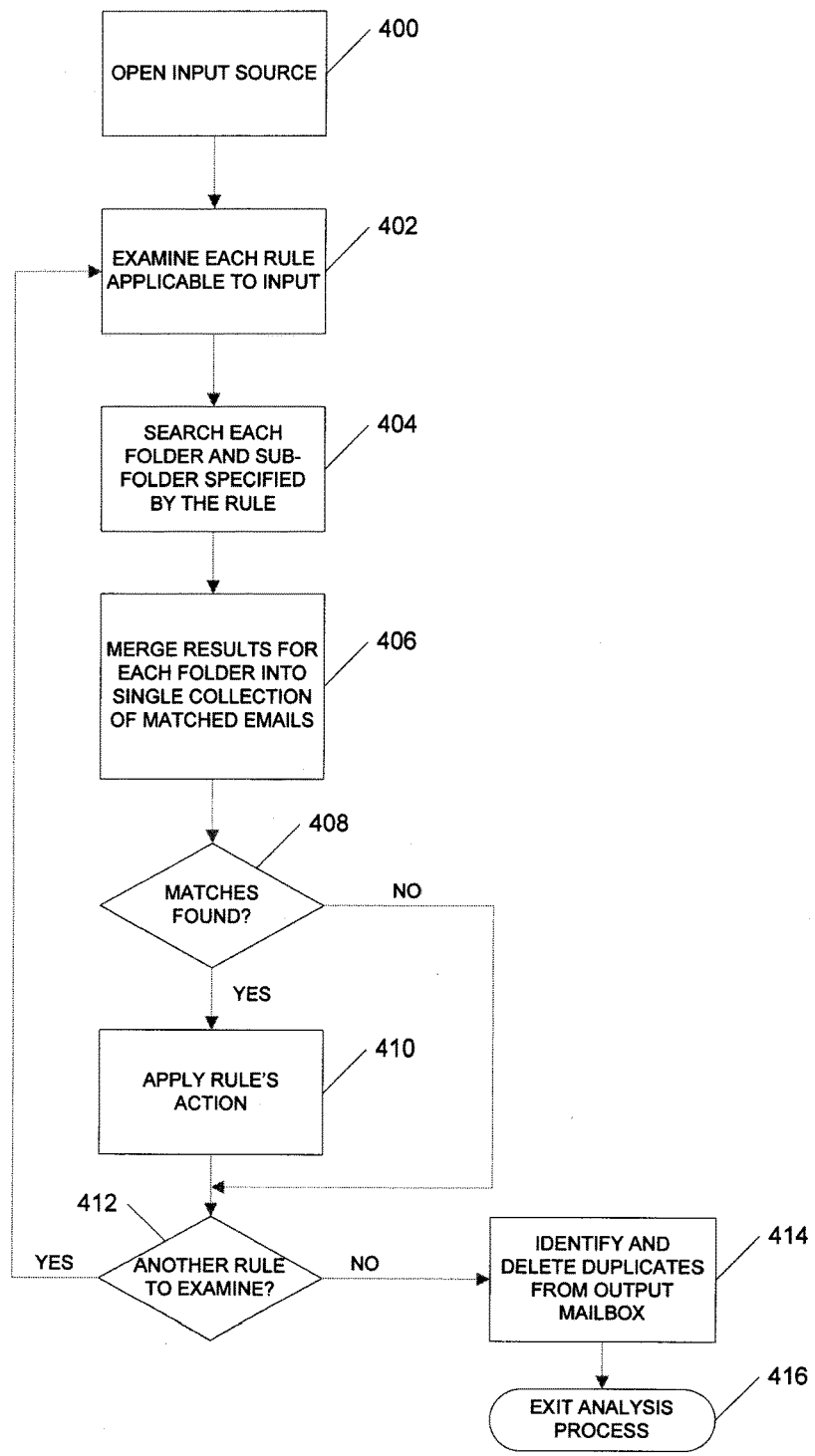
FIG. 4 illustrates the detailed processing logic for the journaled electronic mail analysis and filtering application in an exemplary embodiment.

FIG. 4 illustrates the detailed processing logic for the journaled electronic mail analysis and filtering application in an exemplary embodiment. By way of example, and not limitation, the processing logic can be implemented in a Microsoft Exchange server environment, such as Exchange Server 2000 or Exchange Server 2003. Processing begins with opening of the data source as indicated in logic block 400. The input source can be a PST file or a mailbox store on an Exchange server.

Each rule is examined against the input as indicated in logic block 402. First, the rule's input name is checked to determine if it references the input currently being examined. The status of the rule against this input is determined next. If the rule has been completed, then processing advances to the next rule. It is also determined if any rules that the currently examined rule depends on have completed successfully. The next step in rule processing is to determine if there is an action to be performed for the rule and if the action is valid. Then a check is made to determine if the output specified in the action exists and if the output is valid.

The folder specified by the rule is searched as indicated in logic block 404. If the specified folder contains sub-folders, the sub-folders are searched as well. The results for each folder are merged into a single collection of matched emails as indicated in logic block 406. In decision block 408, a determination is made as to whether email matches were found in the input. If matches were found, the rule's action is applied as indicated in logic block 410. Since this step is the most expensive, except for searching, it can be divided into several concurrent actions to increase throughput. Typically, the number of concurrent actions depends on the number of allowable connections to the output mailbox. This value is configurable at the application level.

In decision block 412, a test is made to determine if there is an additional rule to examine for the input. If there is, the processing logic returns to logic block 402 to process the next rule. After all rules have been applied to all inputs, and if configured to do so, each output is analyzed to remove duplicates as indicated in logic block 414. Duplicates are identified through their Internet message ID, which should be globally unique. This will not account for the same email being sent to many people, if each recipient's email is found to be a match, since they will have different ID's. Temporary files such as PST files used for moving emails from the Exchange server for local processing are deleted if the journaled electronic mail analysis and filtering application is configured to do so. The analysis and filtering process is exited in logic block 416.

There are some settings of the application that can be controlled by command line parameters. By default, when no command line parameters are supplied, the application starts up in silent mode and runs the default job specified by the application configuration file. For example:

MailAnalyzer.exe [/s][/silent] [/w][/window] [/?][/help] [filename]

A dash (-) can be used instead of the slash (/), and arguments are case-insensitive.

Table 1 identifies the command line parameters of the mail analyzer executable.

TABLE 1

| | |
|---|---|
| /s | Runs the application in silent mode, outputting to the |
| /silent | console rather than opening an interactive window. |
| /w | Runs the application in windowed mode, providing an |
| | /window |
| /window | interactive interface and providing additional settings and information. This is the default mode, so this option is unnecessary. |
| /? | Opens the help file. |
| /help | |
| [filename] | The path to the file from which job settings are loaded. This path may be referential. If left blank, the file path will be read from the application configuration file. |

There are two application configuration files located in the same directory as the application itself: CoolMAPI.dll.config and MailAnalyzer.exe.config. The names of these files are arbitrary for purposes of the present description. A MAPI.dll dynamic link library contains various programming functions for using the Microsoft Messaging Application Programming Interface (MAPI). MAPI is used by Microsoft email applications to share email functionality and is required for email applications to operate correctly.

The CoolMAPI.dll.config file contains settings pertaining to the inner workings of a core library, and the MailAnalyzer.exe.config file contains settings pertaining to operation of the mail analyzer application. The settings are contained in the appSettings section of an XML file in a format similar to the following:

<?xml version="1.0" encoding="utf-8" ?>
<configuration>
<appSettings>
<add key="key" value="value"/>
</appSettings>
. . .
</configuration>

The settings in the CoolMAPI.dll.config file include, but are necessarily limited to the following:

| | |
|---|---|
| threads.count | The number of threads to use for certain operations that can be split into multiple concurrent operations, like copying, moving or deleting emails. The default value is 4 in the exemplary embodiment. |
| filter.commentchar | The character that marks comment lines in the files loaded into search filters. The default value is "#" in the exemplary embodiment. |
| filter.delimiter | The character that is used to mark separate values on each line of the files loaded into search filters. The default value is a tab in the exemplary embodiment. |
| folder.separator | The character that is used to separate folders for accessing folders in a message store by name. The default value is "\" in the exemplary embodiment. |
| cachelocation | The path where cached files are located. The default value in the exemplary embodiment is a directory named "FilterCache" under the application directory. |

The settings in the MailAnalyzer.dll.config file include, but are not necessarily limited to the following:

| | |
|---|---|
| jobfile | The path to the job file to load when the application first loads. If this value is passed as a command line parameter, the command line value is used. |

The default mode for the mail analyzer application is interactive mode. At start up, the mail analyzer application loads the default job file, as determined in the mail analyzer application configuration file or by a file name specified via the command line. As illustrated in FIG. 5, this results in the property grid in the Job Settings tab of the mail analyzer user interface being populated with the data from that file.

Figure 6:
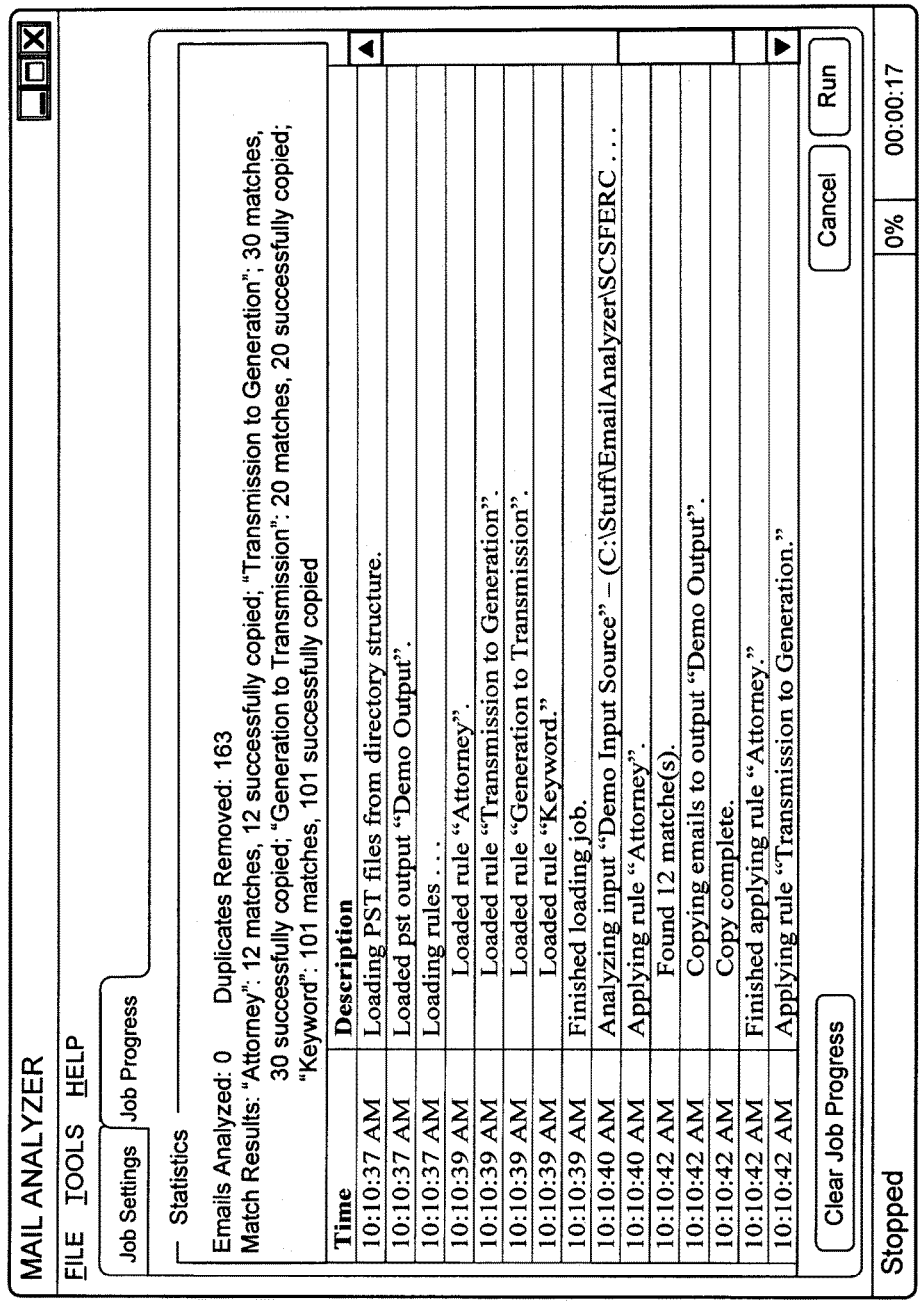
FIG. 6 illustrates the mail analyzer job progress user interface in an exemplary embodiment.

To run the loaded job, the user/administrator clicks the Run button causing the application mail analyzer to run the job. The mail analyzer application will examine the job settings to determine if they are valid, displaying a list of validation errors and warnings if there are any, or just proceeding to run the job if not. At this point, the Job Progress tab of the mail analyzer user interface as illustrated in FIG. 6 becomes active and begins displaying statistics and event notifications.

Below the property grid on the left side of the window illustrated in FIG. 5 are two buttons: Refresh Job Settings and Validate Settings. Clicking on the Refresh Job Settings button will update the property grid to reflect the current state of the job settings. Sometimes the property grid can get out of synchronization with the job settings. For example, this could occur when the Inputs property is expanded and then a new input is added. Clicking on the Validate Settings button examines the settings and displays a list of validation warnings and errors if there are any.

Once the job is running, the job can be cancelled by clicking the Cancel button on the mail analyzer user interface. Depending on the current operation, it could take a few seconds to fully stop the job.

Figure 7:
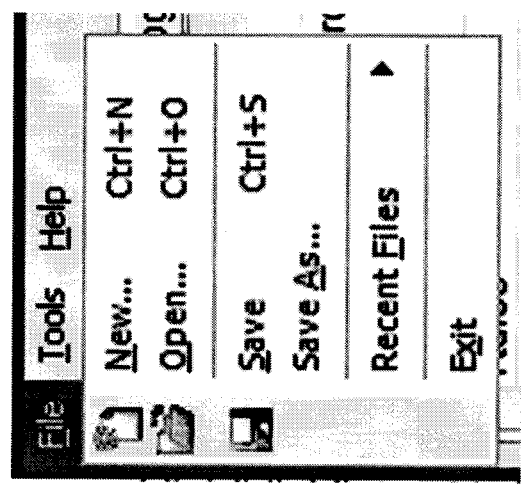
FIG. 7 illustrates a file pull down menu for the mail analyzer application in an exemplary embodiment.

Alternatively, an existing job file can be opened or a new one created through the file pull-down menu illustrated in FIG. 7. If files had been opened previously, they will appear in the Recent Files sub-menu. Also, the values in the property grid on the Job Settings tab can be saved to a file by selecting Save from the File menu. Additional information about editing jobs is described below.

Figure 8:
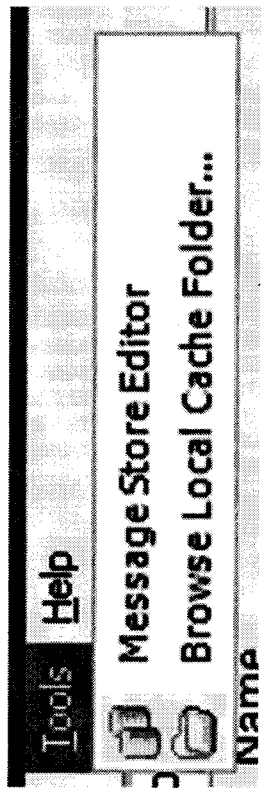
FIG. 8 illustrates a tools pull down menu for the mail analyzer application in an exemplary embodiment.

Next to the File menu is the Tools menu illustrated in FIG. 8. The tools menu contains items for opening a message store editor and for browsing the local cache folder. The message store editor allows the user to edit the properties of emails and some other entities in a PST file, and can be useful for testing purposes. The local cache folder is the location in which the mail analyzer application stores files for local processing, such as when using an Exchange mailbox as an input source.

Figure 9:
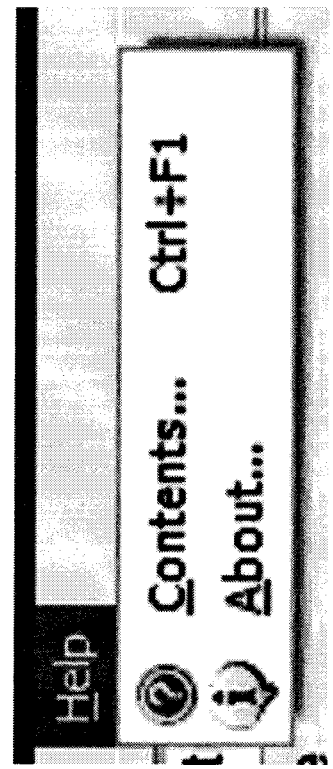
FIG. 9 illustrates a help pull down menu for the mail analyzer application in an exemplary embodiment.

The Help menu, illustrated in FIG. 9, contains an item to access information about the mail analyzer application.

In background (or silent) mode, typically run as a scheduled or batch operation, the mail analyzer application loads the default job or one specified via the command line and then runs the job. The job can only be cancelled in this mode by terminating the process.

Most attributes and operations of a job can be customized in the Job Settings tab of the user interface. These are customized with the property grid in the user interface.

When the mail analyzer application first loads, or when a new or existing job file is opened through the File menu, the Job Settings tab 500 depicted in FIG. 5 becomes visible and the property grid within it populates with that job's settings. There are six properties of a job that can be edited through this interface: the job Name 510, Inputs 520, Outputs 530, Rules 540, Status 550 and Reports 560. All except the job name property expand to reveal additional properties. For properties that accept file names, the paths for those files can be referential, with the root being the mail analyzer application directory. Furthermore, job variables can be used to customize property values. Property names marked with an asterisk in the tables below can accept job variables.

Each cell in the property grid (e.g., Name) has contextual help 570 which is displayed at the bottom of the property grid. When a property like Inputs 520 is expanded and a new input is added to the list, that addition may not be represented in the property grid. When this happens, clicking the "Refresh Job Settings" button 580 at the bottom of the mail analyzer user interface screen will repopulate the property grid with the correct values.

Certain properties of the job settings can contain job variables, which are substituted with the values they represent. Some of these variables are only valid within a certain scope, such as the variable representing the rule name being only valid for properties related directly to a rule.

| | |
|---|---|
| $(JobName) | The name of the job. |
| $(RuleName) | The name of the rule currently being applied. This is only valid for the Folder property of a rule action. |
| $(InputName) | The name of the rule currently being analyzed. This is only valid for the Folder property of a rule action. |
| $(CurrentUser) | The user name that the application is running under. |
| $(Date) | The current date (ex. 01-30-2006). |
| $(Timestamp) | The current date and time separated by an underscore (e.g. 01-30-2006_15:45:05). |

The sole purpose of the job name is to identify the job. This value can be used in other properties, accessed via a job variable.

Inputs 520 are sources of emails, either from an email server (e.g., Exchange) mailbox, one or more PST files, or one or more MSG files. Table 2 indicates the parameters for the input cell 520. FIG. 10 illustrates an exemplary expansion of the Inputs property.

TABLE 2

| | |
|---|---|
| Name | The name of the input. This value is used elsewhere to reference this specific input. |
| Type | The type of input. |
| Location | * The location of the input source. For mailbox inputs, the format is "[Server Name]:[Mailbox Name]". For PST or MSG files, the value is a path and/or a file name mask (e.g.; "*.pst", or "*.*"). |
| Recurse | Whether to recurse the directory structure to look for more inputs. This only applies if the input source is PST files or MSG files. |
| AccessMode | The method to access the input. Remote (for mailbox inputs), pulls from the Exchange server. MoveLocal or CopyLocal moves or copies from the Exchange server to a local cache. |
| UseCache | Whether to look for cached inputs rather than pulling from the live source. For PST and MSG inputs, this results in looking for a listing of discovered files, whereas for mailbox inputs, a PST file is looked for in the local cache. |
| Retain | Whether to keep a locally cached input after processing is complete. |
| MaxResults | The maximum number of emails to pull from each folder in the input. Setting this to \"0\" retrieves all results. |
| MaxBytes | The maximum number of bytes per PST file when loading up MSG files for processing. This value must not exceed 2 GB, at which point PST files become unstable. |

Outputs 530 are for storing the filtered results, either in an email server (e.g., Exchange) mailbox or a PST file. Table 3 indicates parameters for the Outputs 530 cell. FIG. 11 illustrates an exemplary expansion of the Outputs property.

TABLE 3

| | |
|---|---|
| Name | The name of the output source. This value is used elsewhere to reference this specific output. |
| Type | The type of output. |
| Location* | The location of the output source. For mailbox outputs, the format is "[Server Name]:[Mailbox Name]". For PST or MSG files, the value is a path and/or a file name mask (e.g., "*.pst", or "*.*"). |
| AllowDuplicates | Whether to allow duplicate emails to exist in the output source. Duplicates are identified by their unique Internet message ID. |

Figure 13:
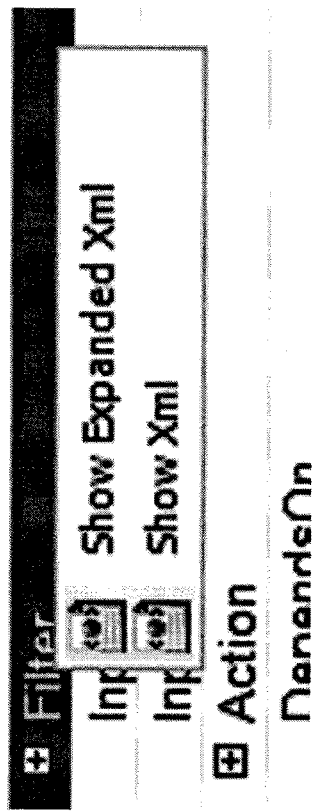
FIG. 13 illustrates a context menu that provides options to view the XML representation of the filter as it will be written to the job XML file.

Rules 540 define how the mail analyzer application should filter emails from input sources, and the action that should be performed with the results. Table 4 indicates parameters for the Rules 540 cell. FIG. 12 illustrates an exemplary expansion of the Rules property for an Attorney rule. FIG. 13 illustrates a context menu that provides options to view the XML representation of the filter as it will be written to the job XML, file.

TABLE 4

| | |
|---|---|
| Name | The name of the rule. This value is used elsewhere to reference this specific rule. |

TABLE 4-continued

| | |
|---|---|
| Filter | The filter (search criteria) to apply. By right-clicking on the filter griditem, a context menu pops up that provides options to view the XML representation of the filter as it will be written to the job XML file. Also, there is an option to view the expanded XML, which more closely represents the filter after values have been read out of a file. |
| Type | The type of filter: Compare, Not or Collection. |
| Target | For compare type filters, the email property to which the comparison is to be applied. |
| Comparison | For compare type filters, the type of comparison to perform. |
| FileName | The path to a text file containing delimited values. |
| Match | For collection type filters, how the sub-filters are applied. |
| Values | For compare type filters, the values to use as comparison values. |
| Value | The type of filter: Compare, Not or Collection. The string representation of the value. For dates, an example would be: "12/1/2005 4:00:00 PM". For relative dates, an example would be: "01:12:45", which is 1 hour, 12 minutes and 45 seconds. |
| DateType | For date values, the type of date. Exact means the value will be interpreted literally, and Relative means it will be calculated relative to some other date value. |
| From | For relative date values, this determines the date to which the value is relative. |
| Filters | For collection or not type filters, the sub-filters that are contained. Not type filters only use the first sub-filter. |
| Input | The name of the input to which this rule applies. Set this to "*" or leave it blank for the rule to apply to all inputs. |
| InputFolder* | The name of the folder in the input(s) to search. Set this to "*" or leave it blank to search all folders. |
| Action | The action to take when matches are found. |
| Type | The type of action to apply. |
| Output | The name of the output to which the rule is to be applied. |
| Folder* | The name of the folder that is the target of the action. This property only applies if the action type is "Move" or "Copy". |
| DependsOn | The rules on which this rule depends. Leave blank for this rule to have no dependency, "*" to depend on all previous rules, or a comma separated list of rule names. |

Figure 14:
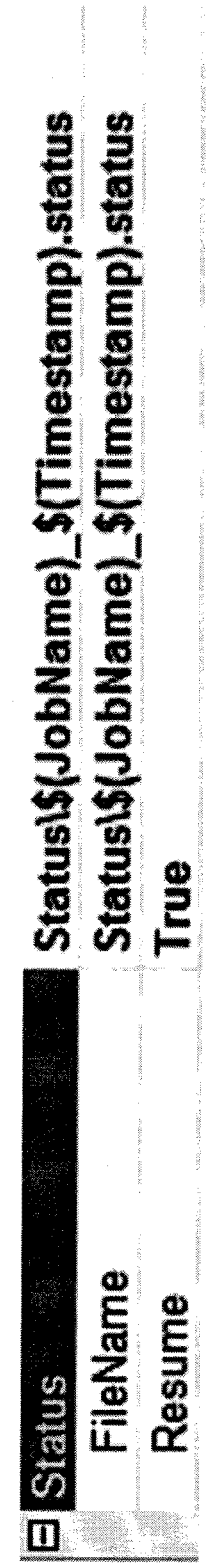
FIG. 14 illustrates an exemplary expansion of the Status property.

Job Status 550 defines where the application maintains the status of its progress, and whether to resume a previous job if incomplete. Table 5 indicates the parameters for the Status 550 cell. FIG. 14 illustrates an exemplary expansion of the Status property.

TABLE 5

| | |
|---|---|
| FileName* | The filename to which the job status is written. |
| Resume | Whether to resume processing from where the status file indicates. |

Figure 15:
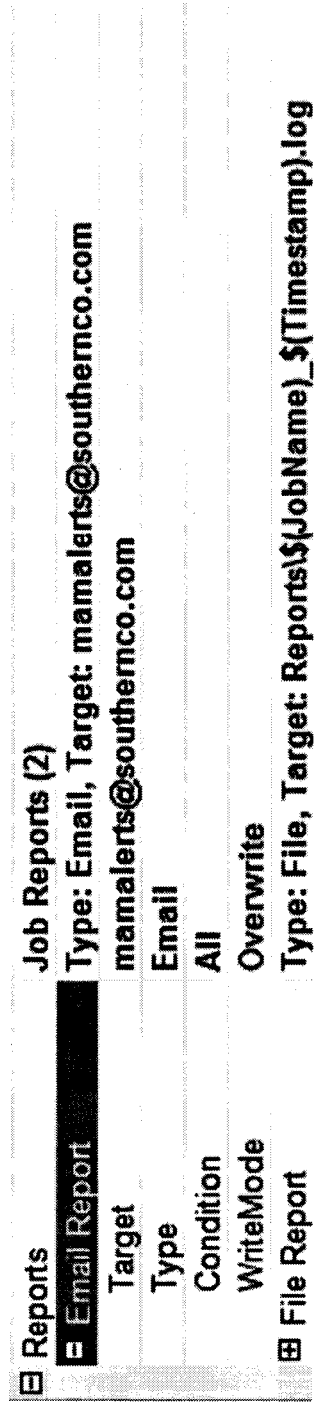
FIG. 15 illustrates an exemplary expansion of the Reports property.

Job Reports 560 provide notification about the results of the job once it is finished. Reports can be either emails, or text files, and can be set to be written only under certain conditions. Table 6 illustrates the parameters for the Reports 560 cell. FIG. 15 illustrates an exemplary expansion of the Reports property.

TABLE 6

| | |
|---|---|
| Target* | Where the report writes to, i.e., a file name or email address. |
| Type | The type of report. |
| Condition | The condition upon which the report is written. For example, if this property is set to "Warning", then the report will only be written if the result of the job run is a warning or error. |
| WriteMode | Sets how to write the report if the target already exists. Only applies if the report type is set to "File". |

FIGS. 16-17 illustrate the exemplary XML representation of the job settings after the values have been read from a file.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed:

1. A method, comprising:
determining select electronic mail messages of a plurality of electronic mail messages that match a filter criteria;
storing the select electronic mail messages in one or more of a plurality of electronic mail server mailboxes;
loading a default job file via an electronic mail analyzer application;
executing a loaded job as a batch operation on the plurality of electronic mail server mailboxes each comprising a plurality of the stored electronic mail messages, wherein the loaded job comprises at least one rule to apply to the plurality of electronic mail messages;
examining job settings of the loaded job to determine whether the job settings are valid;
when the loaded job settings are valid, applying a corresponding predefined action to each select electronic mail message of the plurality of electronic mail messages that matches the filter criteria comprising a type of filter and a numerical string value of electronic mail message selection criteria used to identify each select electronic mail message, the predefined action being identified by the default job and the at least one rule;
copying or moving each select electronic mail message that matches the filter criteria;
generating a report as a result of the loaded job being executed on the plurality of electronic mail messages; and
storing the report.

2. The method of claim 1 further comprising discarding each electronic mail message that does not match the filter criteria.

3. The method of claim 1 further comprising the steps of identifying and removing duplicate electronic mail messages.

4. The method of claim 1 comprising inputting at least one electronic mail message from an input source, wherein the input source comprises a mailbox store on an electronic mail server.

5. The method of claim 4 wherein the input source comprises a personal store (PST).

6. The method of claim 3 further comprising moving the select electronic mail messages that match the filter criteria to an output mailbox for report generation.

7. The method of claim 3 wherein the step of identifying and removing duplicate electronic mail messages comprises determining if more than one electronic mail message has an identical Internet message identifier.

8. The method of claim 1, wherein the applying the filter criteria comprises determining if a filter's input name references the input being examined.

9. The method of claim 1 further comprising searching a folder specified by a filter criterion.

10. The method of claim 9 further comprising merging a result for each folder searched into a collection of matched electronic mails.

11. The method of claim 1 further comprising the step of deleting each electronic mail message after applying the corresponding predefined action.

12. The method of claim 1 further comprising the step of filtering the plurality of electronic mail messages via filtering criteria stored in a job configuration file.

13. The method of claim 12 further comprising configuring the job configuration file to control the analysis and filtering of the plurality of electronic mail messages.

14. A non-transitory computer readable storage medium configured to store instructions that when executed cause a processor to perform:
   determining select electronic mail messages of a plurality of electronic mail messages that match a filter criteria;
   storing the select electronic mail messages in one or more of a plurality of electronic mail server mailboxes;
   loading a default job file via the electronic mail analyzer application;
   executing a loaded job as a batch operation on the plurality of electronic mail server mailboxes each comprising a plurality of the stored electronic mail messages wherein the loaded job comprises at least one rule to apply to the plurality of electronic mail messages;
   examining job settings of the loaded job to determine whether the job settings are valid;
   when the loaded job settings are valid, applying a corresponding predefined action to each select electronic mail message of the plurality of electronic mail messages that matches the filter criteria comprising a type of filter and a numerical string value of electronic mail message selection criteria used to identify each select electronic mail message, the predefined action being identified by the default job and the at least one rule;
   copying or moving each select electronic mail message that matches the filter criteria;
   generating a report as a result of the loaded job being executed on the plurality of electronic mail messages; and
   storing the report.

15. The non-transitory computer readable storage medium of claim 14, wherein the processor is further configured to perform discarding each electronic mail message that does not match the filter criteria.

16. The non-transitory computer readable storage medium of claim 14 wherein the processor is further configured to perform identifying and removing duplicate electronic mail messages.

17. The non-transitory computer readable storage medium of claim 14, comprising an input source, wherein the input source comprises a mailbox store on an electronic mail server.

18. The non-transitory computer readable storage medium of claim 17, wherein the input source comprises a personal store (PST).

19. The non-transitory computer readable storage medium of claim 16, wherein the processor is further configured to perform moving the select electronic mail messages that match the filter criteria to an output mailbox for report generation.

20. The non-transitory computer readable storage medium of claim 16, wherein the processor is further configured to perform determining if more than one electronic mail message has an identical Internet message identifier.

21. The non-transitory computer readable storage medium of claim 14 wherein the processor is further configured to perform determining if a filter's input name references the input being examined.

22. The non-transitory computer readable storage medium of claim 14 wherein the processor is further configured to perform searching a folder specified by a filter criterion.

23. The non-transitory computer readable storage medium of claim 22 wherein the processor is further configured to perform merging a result for each folder searched into a collection of matched electronic mails.

24. The non-transitory computer readable storage medium of claim 14, wherein the processor is further configured to perform deleting each electronic mail message after applying the corresponding predefined action.

25. The non-transitory computer readable storage medium of claim 14, wherein the processor is further configured to perform generating a report when a set of conditions are met as a result of the analysis and filtering of the plurality of electronic mail messages.

26. The non-transitory computer readable storage medium of claim 14 wherein the processor is further configured to perform configuring a job configuration file to control the analysis and filtering of the plurality of electronic mail messages.

27. A system, comprising:
   a local data store;
   a processor that executes a plurality of components including:
   a component that determines select electronic mail messages of a plurality of electronic mail messages that match a filter criteria;
   a component that stores the select electronic mail messages in one or more of a plurality of electronic mail server mailboxes;
   a component that loads a default job file via an electronic mail analyzer application;
   a component that executes a loaded job as a batch operation on the plurality of electronic mail server mailboxes each comprising a plurality of the stored electronic mail messages, wherein the loaded job comprises at least one rule to apply to the plurality of electronic mail messages;
   a component that examines job settings of the loaded job to determine whether the job settings are valid;
   a component that, when the loaded job settings are valid, applies a corresponding predefined action to each select electronic mail message of the plurality of electronic mail messages that matches the filter criteria comprising a type of filter and a numerical string value of electronic mail message selection criteria used to identify each select electronic mail message, the predefined action being identified by the default job and the at least one rule;

a component that copies or moves each select electronic mail message that matches the filter criteria;

a component that generates a report as a result of the loaded job being executed on the plurality of electronic mail messages; and a component that stores the report.

28. The system of claim 27 further comprising a component that discards each electronic mail message that does not match the filter criteria.

29. The system of claim 27 further comprising a component that identifies and removes duplicate electronic mail messages.

30. The system of claim 27 comprising an input source which comprises a mailbox store on an electronic mail server or a personal store (PST).

31. The system of claim 29 further comprising a component that moves the select electronic mail messages that match the filter criteria to an output mailbox for report generation.

32. The system of claim 29 wherein the component that identifies and removes duplicate electronic mail messages comprises a module that determines if more than one electronic mail message has a same Internet message identifier.

33. The system of claim 27, wherein the component which applies the filter criteria comprises a determination if a filter's input name references the input being examined.

34. The system of claim 27 further comprising a component that searches a folder specified by a filter criterion.

35. The system of claim 34 further comprising a component that merges a result for each folder searched into a collection of matched electronic mails.

36. The system of claim 27 further comprising a component that deletes each electronic mail message after the corresponding predefined action is applied.

37. The system of claim 27 further comprising a component that filters the plurality of electronic mail messages via filtering criteria stored in a job configuration file.

38. The system of claim 27 further comprising a component that configures the job configuration file to control the analysis and filter of the electronic mail messages.

\* \* \* \* \*